United States Patent
Maniam et al.

(10) Patent No.: US 7,525,685 B2
(45) Date of Patent: Apr. 28, 2009

(54) TRUE-COLOR COMPUTER MONITOR PREVIEW OF A COLOR PRINT

(75) Inventors: Selvan Maniam, Penang (MY); Joh Joh Ng, Perak (MY); Khee Boon Lin, Penang (MY); Chee Wai Chia, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 899 days.

(21) Appl. No.: 10/974,205

(22) Filed: Oct. 27, 2004

(65) Prior Publication Data

US 2006/0087666 A1 Apr. 27, 2006

(51) Int. Cl.
*H04N 1/60* (2006.01)

(52) U.S. Cl. .................. 358/1.9; 358/504; 358/518; 345/619; 715/274

(58) Field of Classification Search ................ 358/1.9, 358/167, 518, 501, 504; 382/162; 345/604, 345/619; 715/273, 274
See application file for complete search history.

(56) References Cited

U.S. PATENT DOCUMENTS

| | | | |
|---|---|---|---|
| 5,313,291 A * | 5/1994 | Appel et al. ................. 358/501 |
| 5,734,799 A * | 3/1998 | Kusumoto et al. ........... 358/1.9 |
| 5,754,184 A * | 5/1998 | Ring et al. .................. 345/604 |
| 6,031,623 A * | 2/2000 | Smith et al. ................ 358/1.15 |
| 6,118,455 A * | 9/2000 | Hidaka et al. ............... 345/589 |
| 6,151,135 A | 11/2000 | Tanaka et al. |
| 6,268,930 B1 * | 7/2001 | Ohta et al. ................... 358/1.9 |
| 6,281,893 B1 * | 8/2001 | Goldstein ................... 715/733 |
| 6,611,621 B2 * | 8/2003 | Shiraiwa ..................... 382/167 |
| 6,757,076 B1 * | 6/2004 | Mestha et al. ............... 358/1.9 |
| 6,912,306 B1 * | 6/2005 | Nakabayashi et al. ....... 382/167 |
| 6,947,158 B1 * | 9/2005 | Kitamura et al. ........... 358/1.15 |
| 6,989,914 B2 * | 1/2006 | Iwaki ......................... 358/1.9 |
| 7,136,523 B2 * | 11/2006 | Fukao et al. ................. 382/167 |
| 2002/0168103 A1 * | 11/2002 | Shiraiwa ..................... 382/167 |
| 2003/0184779 A1 * | 10/2003 | Ohga ......................... 358/1.9 |
| 2008/0137914 A1 * | 6/2008 | Minhas ....................... 382/112 |
| 2008/0297814 A1 * | 12/2008 | Jacobs et al. ................ 358/1.9 |

* cited by examiner

*Primary Examiner*—Kimberly A Williams (57) ABSTRACT

A color printing system includes a color monitor and printer having different color gamuts. A color chart is printed out by the printer. A light source outputs light to the color printer and a color sensor detects the light reflected from the color chart printout. The sensor outputs sensor color values representing the light received from the color chart printout. A print-preview matrix is calculated from the monitor color chart values and the sensor color values. An image is input to and displayed by the monitor and is converted into a print-preview image using the print-preview matrix. The monitor displays the monitor image and the print-preview image before printing the image.

57 Claims, 4 Drawing Sheets

TRUE-COLOR COMPUTER MONITOR PREVIEW OF A COLOR PRINT

FIELD OF THE INVENTION

The invention relates to the field of color correction. More particularly, the present invention relates to the field of matching colors produced by a color printer and a color display.

BACKGROUND OF THE INVENTION

Color printers are becoming more popular and are taking over from black and white printers such as monochrome inkjet and dot matrix printers. Moreover, the color quality of the prints made by color printers has become photo-like due to the increase of the number of inks used from the conventional 3 different color inks to as many as 6 or 8 different color inks, thereby increasing the color gamut of the printers allowing for closer reproduction by the printers of the colors of the original image and monitor.

In a traditional color printing system, color image data composed of three-dimensional color signals supplied to a personal computer from a color image scanner is displayed on a color monitor and also printed by a color printer.

Additionally, traditional color printers are based on 4-color printing, using black (K), in addition to the three primary colors of cyan (C), magenta (M), and yellow (Y). Theoretically black can be produced by mixing the three CMY colors; however, due to the difficulty in achieving pure black due to impurities in the ink, it's common to add black as a fourth color for printing.

Currently six-and seven-color printers are also available, in which light cyan, light magenta, and other colors are added to the CMYK primaries.

An image displayed on a monitor using the three RGB primary colors must be converted to CMYK for printing. Each computer printer comes with printer driver software that converts color images created on the computer into a data format that can be processed by the color printer.

Monitors and scanners that use the three RGB primary colors, and color printers and printed matter that use the three CMY primary colors, each have a different range of reproducible colors. The full range of colors that can be produced by any color reproduction system is called the color "gamut" of that system. Thus, the monitors, scanners and color printers have different color gamuts.

A picture of all available colors (a color "space") is often drawn as a colored disk. The colored disk is typically a "plane" of a "CIE color space". The color gamuts of individual devices are then drawn on the available gamut as polygons. For color monitors, printers and scanners the polygons typically have six sides corresponding to the six "primary" colors: cyan, magenta, yellow, red, green, and blue. The area inside a polygon represents all the colors that can be achieved with that particular device.

If the color gamut of a color printer and a color monitor are both drawn on the colored disk then the color printer gamut will typically fall within (form a subset of) the color monitor gamut. This is because the gamut of colors that can be reproduced by a CMYK color printer is smaller than what can be shown on an RGB monitor. Thus, the full range of colors that can be displayed on the color monitor cannot be reproduced by the color printer. As a result, RGB colors that look wonderful on a computer screen sometimes become dull or less saturated when converted to CMY (or CMYK) for a color printout.

Gamut mapping is a technique for adjusting the color across different devices so that the image seen by the human viewer will be as consistent as possible when reproduced on devices with different ranges of reproducible color. This technique is used by color management systems (CMS).

There are several different methods for gamut mapping. One simple solution is to move all the points of the color monitor polygon directly inward to the nearest point on that color printer polygon, while matching all other points as accurately as possible. This provides the best possible match to all colors that can be accurately matched, and is great for hitting spot colors, but it tends to produce lousy reproductions of photographs.

Consider a photograph of an apple in which the reds of the highlights have to all be moved, and that by these rules they are all moved to the same point on the color printer polygon. As we view the photograph, we'll see a terrible "fringe" surrounding the highlight as the area of out-of-gamut colors that have been run-together transitions to the area where more accurate color reproduction is possible.

This is often called a "colorimetric" correction which results from a "colorimetric ICC profile".

A more satisfactory solution is to "deform" the entire surface of the color monitor gamut so that all points are moved into the color printer polygon, while avoiding "clipping" colors so that colors that differed in the original are knocked down to be the same color in the reproduction. Colors that are within both of the gamut polygons will be less accurately reproduced, but the reproductions will be free of the "fringes" described above. This is often called a "perceptual" or "photometric" correction which results from a "perceptual ICC profile".

The problem with the color printing process remains that computer monitors have larger color gamuts than do the color printers to which they print. While the existing gamut mapping is helpful, "what you see" on the monitor is not "what you get" from the color printer. It would be desirable to be able to view a preview of an image on a computer monitor that would have the same color quality as what would be printed.

SUMMARY OF THE INVENTION

The present invention provides a preview image of an image to be printed allowing a user to experience "what you see" on the monitor is "what you get" from the color printer. Additionally, the user can manipulate the displayed image to obtain a more desirable printed image.

More specifically, the color printing system includes a color monitor having a first color gamut. Additionally, a color printer has a second color gamut different from the first color gamut. A processor outputs monitor color chart values to the color monitor to display a color chart. It also instructs the color printer to print out a color print of the color chart. A light source outputs light to the color print and a color sensor detects light from the light source reflected from the color print and outputs sensor color values. The processor also calculates a print-preview matrix from the monitor color chart values and the sensor color values, outputs image color values of an image to be printed to the color monitor for displaying a monitor image on the color monitor, and converts the image color values into a print-preview image using the print-preview matrix. The color monitor additionally displays the monitor image and the print-preview image before using the image color values to print the image to be printed. An input device is used to adjust the image color values to adjust the print-preview image and the appearance of the printed out image.

The method for color printing used by the color printing system comprises: processing monitor color chart values and outputting the monitor color chart values to a color monitor having a first color gamut; displaying a color chart on the color monitor; printing out with a color printer having a second color gamut different from the first color gamut a color print of the color chart; outputting light to the color print using a light source; detecting light from the light source reflected from the color print using a color sensor and outputting sensor color values; calculating a monitor matrix from the monitor color chart values; calculating a print-preview matrix from the monitor color chart values and the sensor color values; outputting image color values of an image to be printed to the color monitor for displaying a monitor image on the color monitor; converting the image color values into a print-preview image using the print-preview matrix; displaying the monitor image and the print-preview image on the color monitor before using the image color values to print the image to be printed; printing the image to be printed; and adjusting the image color values with an input device and thereby adjusting the print-preview image and the appearance of the printed out image.

DETAILED DESCRIPTION

Figure 1:
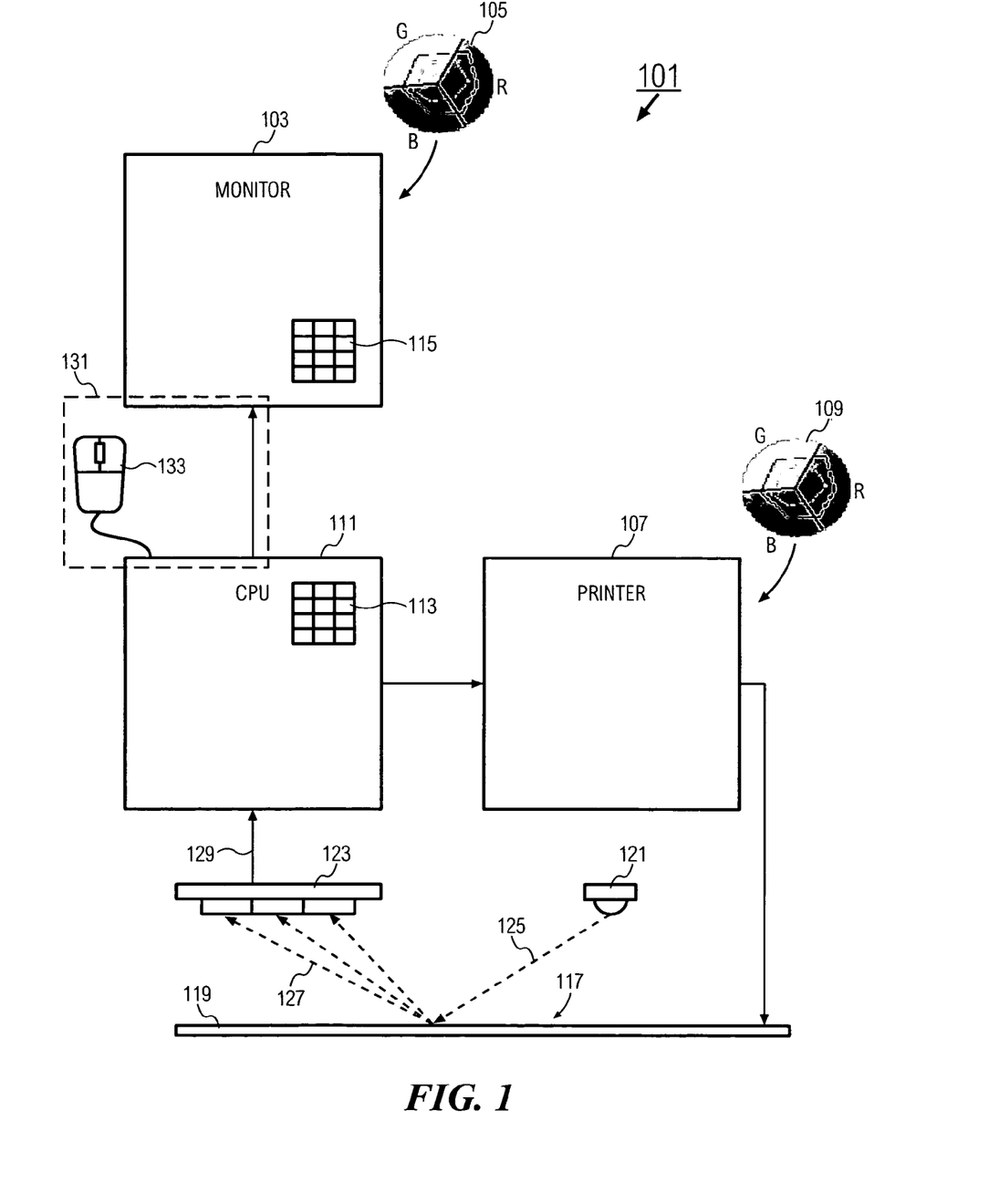
FIG. 1 illustrates a configuration of the color printing system of the present invention.

FIG. 1 illustrates a configuration of the color printing system 101 of the present invention. The system is illustrated in black and white although the actual system produces and displays colors.

A color monitor 103 has a first color gamut 105. A color printer 107 has a second color gamut 109 different from the first color gamut. The color gamuts 105 and 109 are illustrated on the plane of a CIE color space having red "R", green "G" and blue "B" sectors.

FIGS. 3a-d are used to illustrate the color printing method of the present invention which is used by the system illustrated in FIG. 1. The system performs a series of color chart processing STEPS 303. A processor 111, which can be part of a personal computer for example, processes monitor color chart values 113 at STEP 305. These monitor color chart values 113 are output by the processor 111 to the color monitor 103 at STEP 307 and a color chart 115 consisting of multiple colored squares is displayed on the monitor at STEP 309. The colors of the color chart values 113 and color chart 115 are distributed evenly across the color spectrum so that the chart is representative of the color reproduction capability of the color printer 107.

Figure 3A:
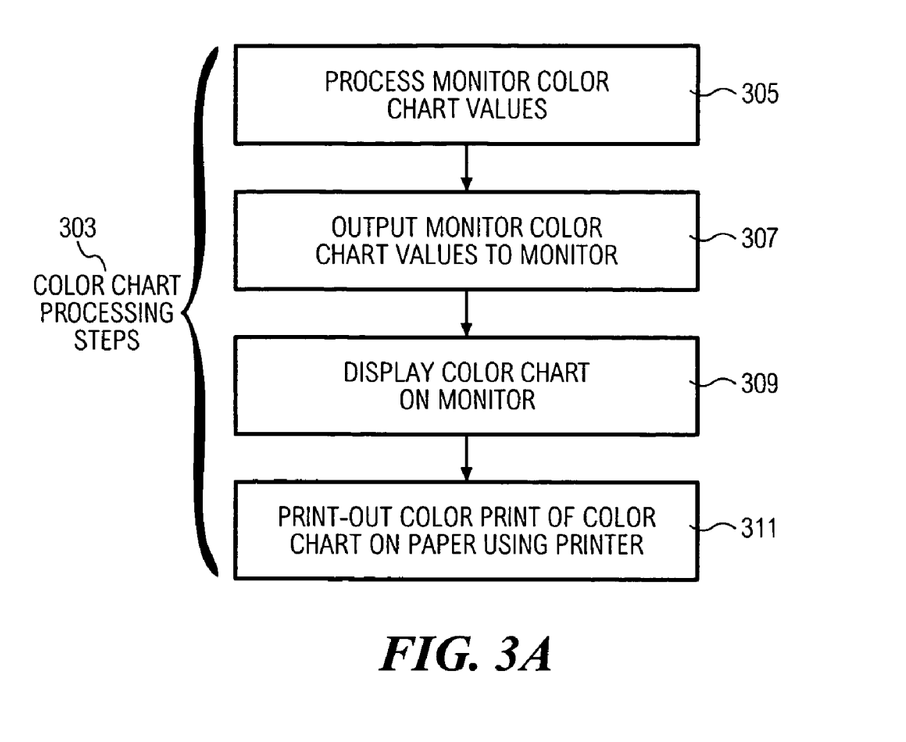
FIGS. 3a-d illustrate the color printing method used by the color printing system of FIG. 1.

The processor 111 instructs the color printer to print out a color print 117 of the color chart onto a media such as a sheet of paper 119 at STEP 311 using the standard printing process for the particular monitor and printer.

Figure 3B:
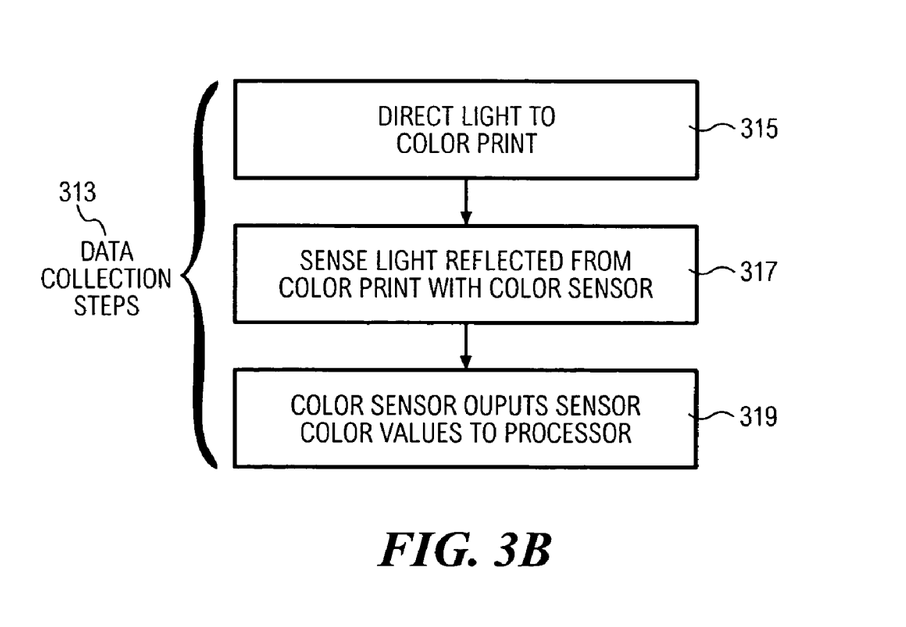

Next, a part of the color printing system 101 including a light source 121 and a color sensor 123 performs a series of data collection steps 313. The light source 121 is preferably a broad spectrum source since such a source can capture more information about the color print 117. A white LED (light emitting diode) is one such broadband source, although other LED colors or types of light sources can be used. One such white light producing LED can be a blue LED with yellow phosphor. The choice of light source can be made based on the types of inks used by the printer 107. The color sensor 123 can be a photo diode or light-to-voltage converter, for example. Also, multiple color sensors can be used in the system. Using more color sensors offers more accurate color mapping. The color sensors can use various types of filters coated onto photodiodes, various types of interference filters and have various shapes. The light source 121 and color sensor 123 can be embodied in a scanner, integral with the printer 107, or embodied in some other device.

Next, data collection steps 313 are performed. The light 125 is directed from the light source 121 to the color print 117 of the color chart 115 at STEP 315. At least a portion of the light 125, i.e. the reflected light 127, is directly reflected off the surface of the color print 117 and is sensed by the color sensor 123 at STEP 317. The color sensor 123 outputs to the processor 111 sensor color values 129 representing actual RGB values produced by the printer 107 at STEP 319. In practice, any number of colors can be used, and as stated above, using more color sensors to provide more colors offers more accurate color mapping.

Figure 3C:
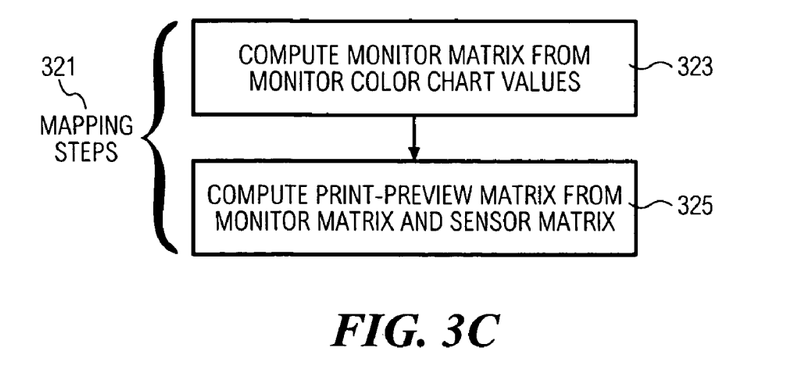

After data collection, the collected sensor color values 129 are processed by the processor 111 to perform mapping STEPS 321. At STEP 323 a monitor matrix is computed from the monitor color chart values 113 and a sensor matrix is computed from the sensor color values 129. The processor 111 calculates a print-preview matrix at STEP 325 from the monitor matrix determined from the monitor color chart values 113 and the sensor matrix determined from the sensor color values 129. The matrix equation is of the form [sensor matrix]=[monitor matrix]×[print-preview matrix]. A second order polynomial mapping can be performed for the case of eight colors resulting in the matrix equation:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

Where $[sR_n, sG_n, sB_n]$ denotes the monitor matrix RGB values determined from the monitor color chart values 113, $[pR_n, pG_n, pB_n]$ denotes the sensor matrix determined by the RGB values of the printout 117 as measured by the color sensor 123 and $[a_n, b_n, c_n]$ is the unknown print-preview matrix.

In other situations, up to 24 colors or more can be used rather than the 8 colors used in this example. Also, the order of the polynomial used in the monitor matrix can be less than or greater than two (2). The method is the same regardless of the number of colors and the order of the polynomial used.

In the present example, the resulting mapping equations are:

$pR = a_1 \cdot sR + a_2 \cdot sG + a_3 \cdot sB + a_4 \cdot sR^2 + a_5 \cdot sG^2 + a_6 \cdot sB^2$ $pG = b_1 \cdot sR + b_2 \cdot sG + b_3 \cdot sB + b_4 \cdot sR^2 + b_5 \cdot sG^2 + b_6 \cdot sB^2$ $pB = c_1 \cdot sR + c_2 \cdot sG + c_3 \cdot sB + c_4 \cdot sR^2 + c_5 \cdot sG^2 + c_6 \cdot sB^2$ The print-preview matrix, and thus the individual mapping coefficients of the print-preview matrix, is obtained by multiplying the sensor matrix by the Moore Penrose pseudoinverse of the monitor matrix. Methods for finding the Moore Penrose pseudoinverse matrix are well known in the art and will not be described here.

Figure 2:
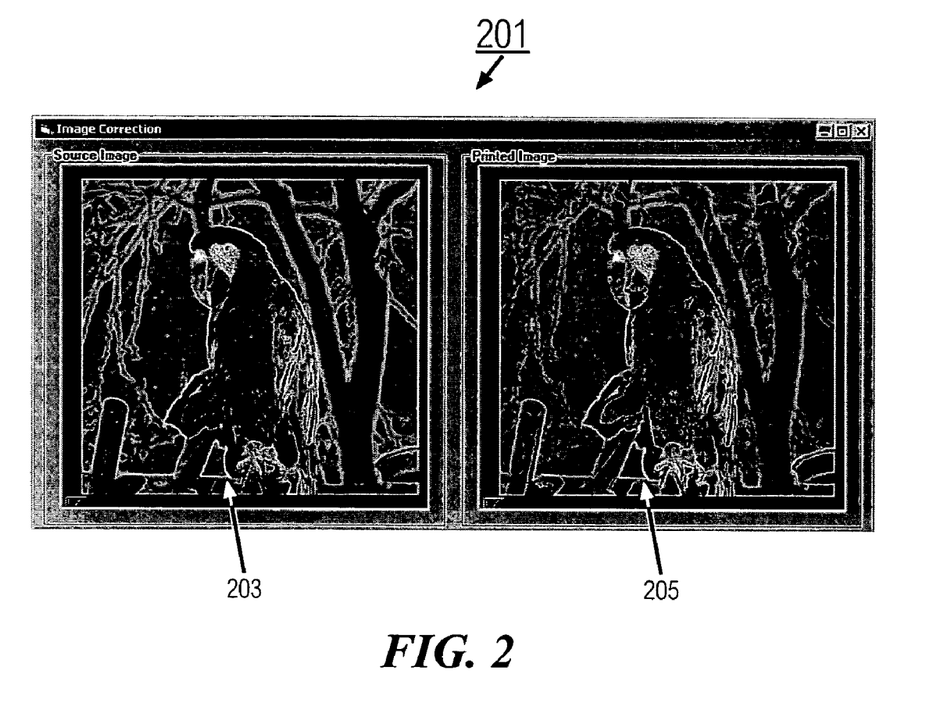
FIG. 2 illustrates a comparison window displayed on a monitor for displaying a monitor image and a print-preview image on the color monitor.

After the mapping process, a print-preview process is performed at STEPS 327 whereby the calculated print-preview matrix is used to generate a print-preview image 205 on the monitor 103. This process is described with reference to FIG. 2 in addition to FIGS. 1 and 3. The images of the figures are black and white simplified representations of the multi-colored images which are actually processed by the present invention. FIG. 2 illustrates a comparison window 201 displayed on the monitor 103 for displaying a monitor image 203 and the print-preview image 205 on the color monitor 103 giving the user an idea of what the monitor image 203 will look like when printed out.

Figure 3D:
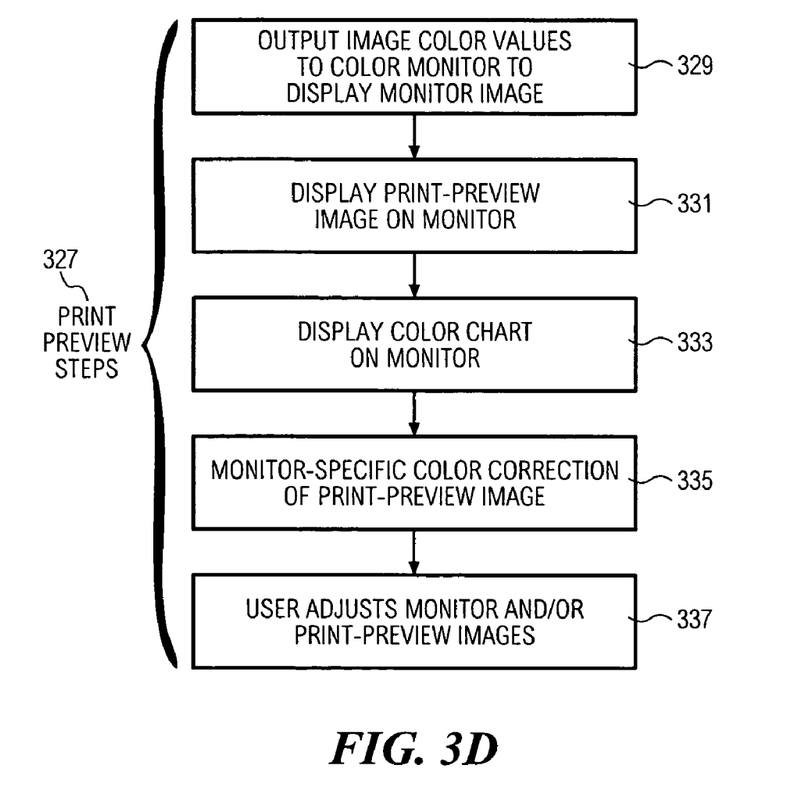

At STEP 329 image color values of an image to be printed are output to the color monitor 103 and displayed as the monitor image 203. The monitor image 203 can be acquired in many different ways such as by scanning a hardcopy, downloading the image from a storage device or downloading the image from a digital camera.

At STEP 331 the matrix of image color values of the monitor image 203 are converted to a matrix of pR, pG and pB print-preview image color values using the print-preview matrix and displayed on the color monitor 103 as the print-preview image 205 at STEP 333.

At STEP 335 additional adjustments for more accurate color matching can be made to the print-preview image 205 by applying the following correction to the matrix of pR, pG and pB print-preview image color values:

$$pR = \alpha \cdot sR + (1-\alpha) \cdot pR$$

$$pG = \beta \cdot sG + (1-\beta) \cdot pG$$

$$pB = \gamma \cdot sB + (1-\gamma) \cdot pB$$

where $\alpha$, $\beta$, and $\gamma$ are user selected mapping strength values. The higher the values, the stronger the degree of applied color correction. These values are chosen to create the best match for a specific monitor 103.

Using the resulting print-preview matrix, any monitor RGB color can be mapped to the RGB color that will be created by the printer 107. Hence, using the equations above, images displayed on the monitor 103 can be corrected to give the user an idea of what will be printed out.

The user can use the print-preview image 205 to predict the resultant print quality before printing and can therefore be assured that what is seen on the monitor 103 will be what is created by the printer 107.

Prior to printing the print-preview image 205, an additional STEP 337 can be performed whereby the user adjusts the desirable printing quality of the print-preview image 205 (e.g. adjusts the colors, intensity, etc.) before proceeding to print so that the printed image will have a desirable appearance.

An input device 131 can be used to control the adjustment of STEP 337. The input device can be a computer mouse 133 in combination with the processor 111 and the monitor 103. The input device 131 is operated by a user to adjust the colors of the print-preview image 205 so that the difference between the colors of the print-preview image and the colors of the monitor image 203 and/or image to be printed is reduced. The computer mouse 133 can provide input to the processor 111 to adjust the colors based on moving a slide-bar displayed on the monitor 103, for example.

In the foregoing specification, the invention has been described with reference to specific exemplary embodiments thereof. The specification and drawings are, accordingly, to be regarded in an illustrative sense rather than a restrictive sense.

The invention claimed is:

1. A color printing system comprising:
   a color monitor having a first color gamut;
   a color printer having a second color gamut different from the first color gamut;
   a light source for projecting light upon a color chart printed by the color printer;
   a color sensor for detecting light reflected from the printed color chart and generating therefrom, a set of sensor color values; and
   a processor for:
   computing a sensor matrix from the set of sensor color values received from the color sensor;
   computing a monitor matrix from a set of monitor color chart values that are used for generating a reference image of the color chart on the color monitor;
   calculating a print-preview matrix from the monitor matrix and the sensor matrix; and
   using the print-preview matrix for generating a print-preview image on the color monitor whereby a viewer compares the print-preview image against the reference image and adjusts the print-preview image in accordance with a format characterized as a what-you-see-on-the-monitor is what-you-get-from-the-printer.

2. The system of claim 1, wherein the light source is an LED.

3. The system of claim 1, wherein the processor is part of a personal computer.

4. The system of claim 1, wherein the printed color chart comprises multiple colored squares.

5. The system of claim 1, wherein the processor calculates the print-preview matrix from a monitor matrix and a sensor matrix using an equation:

[sensor matrix]=[monitor matrix]×[print-preview matrix].

6. The system of claim 5, wherein the equation uses at least 8 different color values to calculate the print-preview matrix.

7. The system of claim 5, wherein the monitor matrix includes a second order polynomial.

8. The system of claim 5, wherein the print-preview image is adjusted according to the equations:

$$pR = \alpha \cdot sR + (1-\alpha) \cdot pR$$

$$pG = \beta \cdot sG + (1-\beta) \cdot pG$$

$$pB = \gamma \cdot sB + (1-\gamma) \cdot pB$$

where $\alpha$, $\beta$, and $\gamma$ are user selected mapping strength values, pR, pG and pB are coefficients of the sensor matrix, and sR, sG and sB are coefficients of the monitor matrix.

9. The system of claim 1, wherein adjusting the print-preview image comprises adjusting colors of the print-preview image so that the difference between the colors of the print-preview image and colors of the reference image is reduced.

10. The system of claim 1, wherein calculating the print-preview matrix comprises solving a matrix equation of the form [sensor matrix]=[monitor matrix]×[print-preview matrix] defined as:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

where $n \geq 2$, $x \geq 2$, and y=number of columns present in the monitor matrix.

11. The system of claim 10, wherein n=8.

12. The system of claim 10, wherein n=24.

13. The system of claim 1, wherein calculating the print-preview matrix comprises solving a matrix equation of the form [sensor matrix]=[monitor matrix]×[print-preview matrix] defined as:

$$\begin{bmatrix} pR_1 & pG_1 & pB_1 \\ pR_2 & pG_2 & pB_2 \\ pR_3 & pG_3 & pB_3 \end{bmatrix} = \begin{bmatrix} sR_1 & sG_1 & sB_1 \\ sR_2 & sG_2 & sB_2 \\ sR_3 & sG_3 & sB_3 \end{bmatrix} \times \begin{bmatrix} a_1 & b_1 & c_1 \\ a_2 & b_2 & c_2 \\ a_3 & b_3 & c_3 \end{bmatrix}.$$

14. A method for color printing comprising:

printing a color chart using a color printer, the color printer having a second color gamut different from a first color gamut of a color monitor;

projecting light upon the printed color chart using a light source;

detecting light reflected from the printed color chart using a color sensor and generating therefrom, a set of sensor color values;

using a set of monitor color values for generating a reference image of the color chart on the color monitor;

calculating a monitor matrix from the set of monitor color values;

calculating, a sensor matrix from the set of sensor color values;

calculating a print-preview matrix from the monitor matrix and the sensor matrix;

displaying on the color monitor, beside the reference image, a print-preview image using the print preview matrix; and comparing the print-preview image against the reference image for adjusting the print-preview image in accordance with a format characterized as a what-you-see-on-the-monitor is what-you-get-from-the-printer.

15. The method of claim 14, wherein the light source is an LED.

16. The method of claim 14, wherein the processor is part of a personal computer.

17. The method of claim 14, further comprising printing multiple colored squares to print the color chart.

18. The method of claim 14, further comprising printing the color chart onto paper.

19. The method of claim 14, wherein the light source and the color sensor are part of a scanner.

20. The method of claim 14, wherein the light source and the color sensor are part of the color printer.

21. The method of claim 14, wherein calculating the print-preview matrix makes use of the monitor matrix and the sensor matrix and an equation:

[sensor matrix]=[monitor matrix]×[print-preview matrix].

22. The method of claim 21, wherein the equation uses at least 8 different color values to calculate the print-preview matrix.

23. The method of claim 21, wherein the monitor matrix includes a second order polynomial.

24. The method of claim 21, further comprising adjusting the print-preview image prior to printing according to the equations:

$pR = \alpha \cdot sR + (1-\alpha) \cdot pR$ $pG = \beta \cdot sG + (1-\beta) \cdot pG$ $pB = \gamma \cdot sB + (1-\gamma) \cdot pB$ where $\alpha$, $\beta$, and $\gamma$ are user selected mapping strength values, pR, pG and pB are coefficients of the sensor matrix, and sR, sG and sB are coefficients of the monitor matrix.

25. The method of claim 14, further comprising adjusting colors of the print-preview image so that the difference between the colors of the print-preview image and colors of the reference image is reduced.

26. A color printing system comprising:

a processor;

a color monitor having a first color gamut, the color monitor adapted to display color images based on image color values received from the processor including displaying a color chart based on monitor color chart values received from the processor;

a color printer having a second color gamut, the color printer adapted to print color images based on the image color values received from the processor including printing the color chart based on the monitor color chart values received by the processor; and a color sensor adapted to sense light reflected from the printed color chart and provide sensor color values to the processor;

wherein the processor is adapted to:

generate a sensor matrix using the sensor color values;

generate a monitor matrix using the monitor color chart values;

generate a print-preview matrix based on an equation:

[sensor matrix]=[monitor matrix]×[print-preview matrix];

generate print-preview image color values based on the image color values and the print-preview matrix; and output the image color values and print-preview image color values corresponding to an image to be printed to the color monitor, such that both a monitor image and a print-preview image are displayed by the color monitor.

27. The printing system of claim 26, wherein the color sensor includes a light source for illuminating the color chart.

28. The printing system of claim 27, wherein the light source and the color sensor are components of a printer.

29. The printing system of claim 27, wherein the light source and the color sensor are components of a scanner.

30. The printing system of claim 26, wherein the monitor matrix represents a second order polynomial.

31. The printing system of claim 26, wherein the print-preview matrix is calculated according to the matrix equation:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

where
sRn, sGn, sBn are coefficients of the monitor matrix;
pRn, pGn, pBn are coefficients of the sensor matrix; and
an, bn, cn are coefficients of the print-preview matrix.

32. The printing system of claim 31, further comprising an input device allowing a user to manually adjust the coefficients of the print-preview matrix to control the color mapping from the image color values to the print-preview image color values.

33. The printing system of claim 32, wherein the print-preview image is adjusted according to the equations:

$pR = \alpha \cdot sR + (1-\alpha) \cdot pR$ $pG = \beta \cdot sG + (1-\beta) \cdot pG$ $pB = \gamma \cdot sB + (1-\gamma) \cdot pB$ where $\alpha$, $\beta$, and $\gamma$ are user selectable mapping adjustment parameters, pR, pG, and pB are the coefficients of the sensor matrix, and sR, sG, and sB are the coefficients of the monitor matrix.

34. A printing system comprising:
a first display medium;
a print medium;
means for displaying a first color chart on the first display medium based on color chart values;
means for printing a second color chart on the print medium;
means for scanning the second color chart to generate sensor color values;
means for generating color mapping coefficients based on the color chart values and the sensor color values, the means comprising a processor for calculating a print-preview matrix from a monitor matrix based on the color chart values, and a sensor matrix based on the sensor color values, according to an equation:

[sensor matrix]=[monitor matrix]×[print-preview matrix];

means for mapping image color values for an image to be printed to preview image color values based on the color mapping coefficients; and
means for displaying on the first display medium a first image according to the image color values and a second image according to the preview image color values.

35. The printing system of claim 34, wherein the means for scanning includes a light source for illuminating the second color chart and a light sensor for sensing light reflected from the second color chart.

36. The printing system of claim 35, wherein the light source and the light sensor are components of a printer.

37. The printing system of claim 35, wherein the light source and the light sensor are components of a scanner.

38. The printing system of claim 35, wherein the monitor matrix corresponds to a second order polynomial.

39. The printing system of claim 38, wherein the print-preview matrix is calculated according to the matrix equation:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

where
sRn, sGn, sBn are coefficients of the monitor matrix;
pRn, pGn, pBn are coefficients of the sensor matrix; and
an, bn, cn are coefficients of the print-preview matrix.

40. The printing system of claim 39, further comprising an input means allowing a user to manually adjust the coefficients of the print-preview matrix to control color mapping from the image color values to the preview image color values.

41. The printing system of claim 40, wherein the coefficients of the print-preview matrix are adjusted according to the equations:

$pR = \alpha \cdot sR + (1-\alpha) \cdot pR$ $pG = \beta \cdot sG + (1-\beta) \cdot pG$ $pB = \gamma \cdot sB + (1-\gamma) \cdot pB$ where $\alpha$, $\beta$, and $\gamma$ are user selectable mapping adjustment parameters, pR, pG, and pB are the coefficients of the sensor matrix, and sR, sG, and sB are the coefficients of the monitor matrix.

42. A method for color printing comprising:
printing a color chart based on monitor color chart values;
scanning the printed color chart to obtain scanned color chart values;
generating a print-preview matrix by solving a matrix equation:
[scan matrix]=[display matrix]×[print-preview matrix] where the [scan matrix] is a matrix of coefficients corresponding to the scanned color chart values, and the [display matrix] is a matrix of coefficients corresponding to the monitor color chart values;
generating print-preview image color values based on image color values and the mapping coefficients of the print-preview matrix; and
displaying a first image corresponding to the image color values and a second image corresponding to the print-preview image color values.

43. The method of claim 42, wherein the display matrix corresponds to a second order polynomial.

44. The method of claim 43, wherein solving the matrix equation comprises multiplying the scan matrix by the Moore Penrose pseudoinverse of the display matrix.

45. The method of claim 42, wherein generating the print-preview matrix comprises solving the matrix equation:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

where sRn, sGn, sBn are coefficients of the display matrix;
pRn, pGn, pBn are coefficients of the scan matrix; and
an, bn, cn are the mapping coefficients of the print-preview matrix.

46. The method of claim 42, further comprising adjusting color mapping based on the first and second images.

47. The method of claim 46, wherein adjusting the color mapping comprises reducing visual differences between the second image and a corresponding printed image.

48. The method of claim 46, wherein adjusting the color mapping comprises enhancing the colors of the second image so that a corresponding printed image will have a desired appearance.

49. The method of claim 46, wherein the color mapping is adjusted according to the color mapping equations:

$pR = \alpha \cdot sR + (1-\alpha) \cdot pR$ $pG = \beta \cdot sG + (1-\beta) \cdot pG$ $pB = \gamma \cdot sB + (1-\gamma) \cdot pB$ where $\alpha$, $\beta$, and $\gamma$ are user selectable mapping adjustment parameters, pR, pG, and pB are the coefficients of the sensor matrix, and sR, sG, and sB are the coefficients of the monitor matrix.

50. A computer readable medium storing machine accessible instructions executable by a processor, the instructions comprising:
    printing a color chart based on monitor color chart values;
    scanning the printed color chart to obtain scanned color chart values;
    generating a print-preview matrix by solving a matrix equation:
    [scan matrix]=[display matrix]×[print-preview matrix]
    where the [scan matrix] is a matrix of coefficients corresponding to the scanned color chart values, and the [display matrix] is a matrix of coefficients corresponding to the monitor color chart values;
    generating print-preview image color values based on image color values and the mapping coefficients of the print-preview matrix; and
    displaying a first image corresponding to the image color values and a second image corresponding to the print-preview image color values.

51. The computer readable medium of claim 50, wherein the display matrix corresponds to a second order polynomial.

52. The computer readable medium of claim 51, wherein solving the matrix equation comprises multiplying the scan matrix by the Moore Penrose pseudoinverse of the display matrix.

53. The computer readable medium of claim 50, wherein generating the print-preview matrix comprises solving the matrix equation:

$$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix} \cdot \begin{pmatrix} a_1 & b_1 & c_1 \\ a_2 & b_2 & c_2 \\ a_3 & b_3 & c_3 \\ a_4 & b_4 & c_4 \\ a_5 & b_5 & c_5 \\ a_6 & b_6 & c_6 \end{pmatrix}$$

where
sRn, sGn, sBn are coefficients of the display matrix;
pRn, pGn, pBn are coefficients of the scan matrix; and
an, bn, cn are the mapping coefficients of the print-preview matrix.

54. The computer readable medium of claim 50, further comprising adjusting color mapping based on the first and second images.

55. The computer readable medium of claim 54, wherein adjusting the color mapping comprises reducing visual differences between the second image and a corresponding printed image.

56. The computer readable medium of claim 54, wherein adjusting the color mapping comprises enhancing the colors of the second image so that a corresponding printed image will have a desired appearance.

57. The computer readable medium of claim 54, wherein the color mapping is adjusted according to the color mapping equations:

$pR = \alpha \cdot sR + (1-\alpha) \cdot pR$ $pG = \beta \cdot sG + (1-\beta) \cdot pG$ $pB = \gamma \cdot sB + (1-\gamma) \cdot pB$ where $\alpha$, $\beta$, and $\gamma$ are user selectable mapping adjustment parameters, pR, pG, and pB are the coefficients of the sensor matrix, and sR, sG, and sB are the coefficients of the monitor matrix.

* * * * *

UNITED STATES PATENT AND TRADEMARK OFFICE
CERTIFICATE OF CORRECTION

PATENT NO. : 7,525,685 B2
APPLICATION NO. : 10/974205
DATED : April 28, 2009
INVENTOR(S) : Joh Joh Ng et al.

It is certified that error appears in the above-identified patent and that said Letters Patent is hereby corrected as shown below:

Column 7, Lines 2-9, Claim 10, delete "$\begin{pmatrix} pR_1 & pG_1 & pB_1 \\ \vdots & \vdots & \vdots \\ pR_8 & pG_8 & pB_8 \end{pmatrix} = \begin{pmatrix} sR_1 & sG_1 & sB_1 & sR_1^2 & sG_1^2 & sB_1^2 \\ \vdots & \vdots & \vdots & \vdots & \vdots & \vdots \\ sR_8 & sG_8 & sB_8 & sR_8^2 & sG_8^2 & sB_8^2 \end{pmatrix}$," and insert -- $\begin{bmatrix} pR_1 & pG_1 & pB_1 \\ | & | & | \\ | & | & | \\ | & | & | \\ pR_n & pG_n & pB_n \end{bmatrix} = \begin{bmatrix} sR_1 & sG_1 & sB_1 & -- & sR_1^x & sG_1^x & sB_1^x \\ | & | & | & -- & | & | & | \\ | & | & | & -- & | & | & | \\ | & | & | & -- & | & | & | \\ sR_n & sG_n & sB_n & -- & sR_n^x & sG_n^x & sB_n^x \end{bmatrix}$ --.

Column 11, Line 23, Claim 49, after "pB are" delete "the".

Column 11, Line 24, Claim 49, delete "sensor" and insert --scan--.

Column 11, Line 24, Claim 49, after "sB are" delete "the".

Column 11, Line 25, Claim 49, delete "monitor" and insert --display--.

Column 11, Line 26, Claim 50, delete "storing" and insert --having stored thereon--.

Column 12, Line 43 (approx.), Claim 57, after "pB are" delete "the".

Column 12, Line 44 (approx.), Claim 57, delete "sensor" and insert --scan--.

Column 12, Line 44 (approx.), Claim 57, after "sB are" delete "the".

Column 12, Line 45 (approx.), Claim 57, delete "monitor" and insert --display--.

Signed and Sealed this
Twelfth Day of March, 2013

Teresa Stanek Rea
*Acting Director of the United States Patent and Trademark Office*